Patented Aug. 14, 1928.

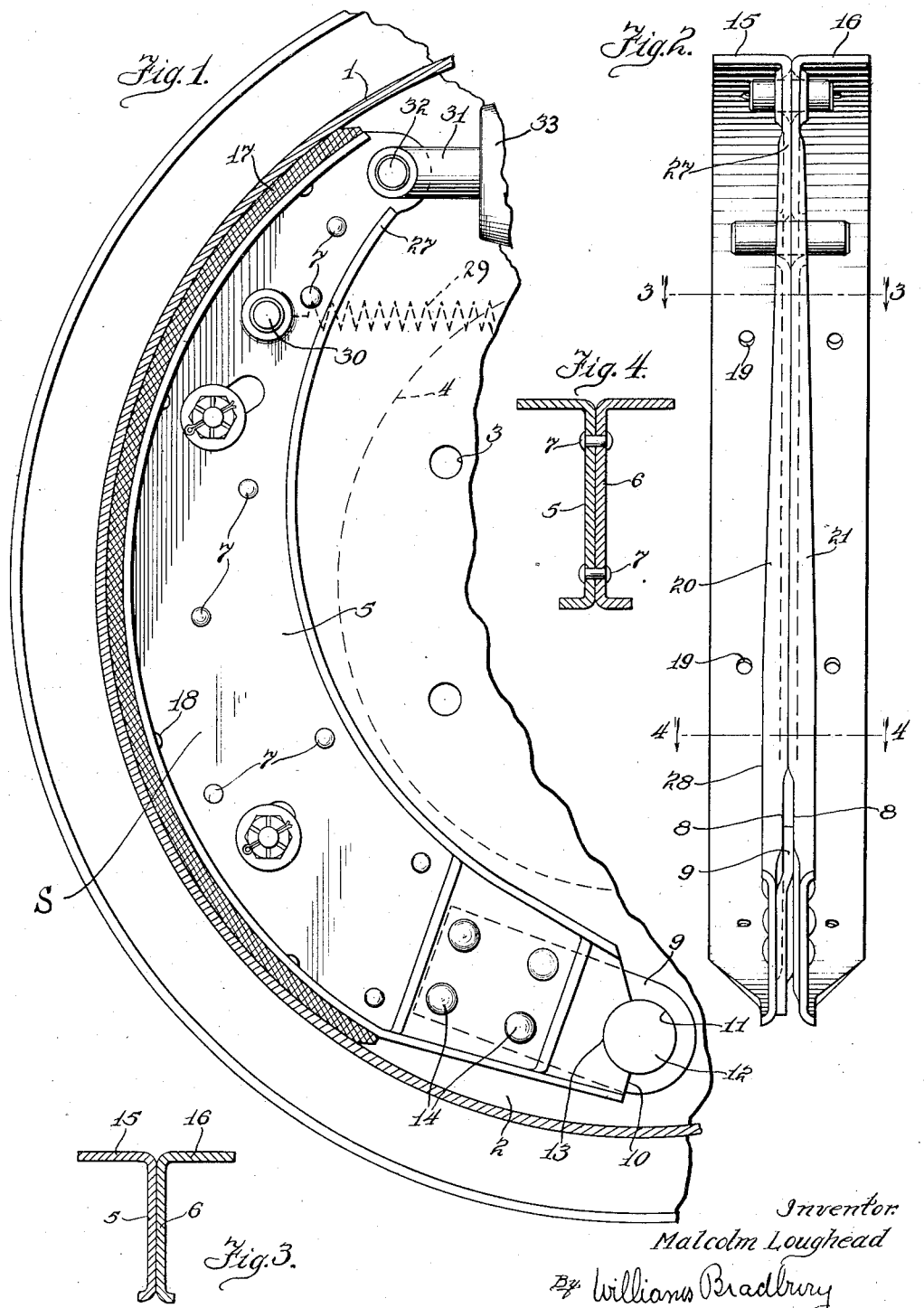

1,680,911

UNITED STATES PATENT OFFICE.

MALCOLM LOUGHEAD, OF DETROIT, MICHIGAN, ASSIGNOR TO HYDRAULIC BRAKE COMPANY, OF DETROIT, MICHIGAN, A CORPORATION OF CALIFORNIA.

BRAKE SHOE.

Application filed March 17, 1927. Serial No. 175,956.

My invention relates to improvements in brake shoes and more particularly to that type of brake shoe constructed of stamped steel sheeting.

An object of the invention is to provide a brake shoe of the character described which may be manufactured economically yet without sacrifice of strength or rigidity.

A further object of the invention is to provide a brake shoe of the character described which is light in weight and in which novel structure is employed to afford maximum rigidity so that the shoe, though pressed from sheet steel, may possess all of the advantages as to durability found in the heavier and more bulky cast metal shoe.

Other objects of my invention will appear as this description progresses, reference being had to the accompanying drawings, in which Figure 1 is an elevation of my improved brake shoe in an operative position;

Figure 2 is a side view of the shoe illustrated in Figure 1 with the brake lining removed;

Figure 3 is a sectional view along the line 3—3 of Figure 2;

And Figure 4 is a sectional view along the line 4—4 of Figure 2.

My improved brake shoe was intended for use as a part of an internal brake mechanism for vehicle wheels of which a brake drum 1 (see Figure 1) forms a part. A stationary dust-pan 2 secured as by bolts through openings 3 of the dust-pan to a portion of the axle assembly 4 provides means upon which the shoes of the brake mechanism are mounted. In the drawings I have shown but a fragmentary portion of the complete braking mechanism including one entire shoe and its mounting.

The shoe S consists of a pair of laterally abutting pressed steel members 5 and 6 secured to each other by the provision of a plurality of rivets 7.

These plates are substantially each of crescent shape so that the profile of the shoe presents the shape of a crescent with one end of greater width than the other.

That end of greater width is formed with portions of the plates 5 and 6 spaced slightly apart from one another as shown at 8 for the introduction of an insert plate 9 extending beyond the outermost end 10 of the shoe. This insert 9 has an opening 11 therethrough for receiving a brake shoe mounting pin 12 which is secured to and projects from the dust-pan 2.

Adjacent portions 13 of the ends 10 of each plate 5 and 6 are fashioned to conform to the surface of the pin 12 and register with adjacent edges of the opening 11, thus providing thrust bearing surfaces for the shoe against pin 12. The plate 9 is secured by rivets 14 to the shoe S.

In forming the pressed steel plates 5 and 6 laterally extending perpendicular portions 15 and 16 are provided at the outer peripheral edges 5 and 6, respectively. The outer surfaces of the portions 15 and 16 are contiguous and provide supporting surface for a brake shoe lining 17 which is secured thereto in the usual manner by rivets 18 projected through openings 19, as shown in Figure 2. The width of the portions 15 and 16 is uniform throughout the entire lengths thereof.

Means for reinforcing the shoe to render it extremely rigid and of particular novelty in its application to brake shoes is provided in the flanged portions 20 and 21 formed of the plates 5 and 6 at their inner peripheral edges. These flanged portions taper gradually from the outer end portion 22 to the inner end portions 28 thereof. The tapering flange portions 20 and 21 increase in width as they approach the fulcrum or pivotal mounting 12 of the shoe. Thus the shoe possesses greater rigidity in those regions where the strain upon the plates is greater. I consider this feature of utmost importance in brake shoe construction as it provides for maximum rigidity with minimum mass so that the shoe is not only light in weight but occupies less space than the present style shoe. Incidentally, the tapering flange portions 20 and 21 provide ample clearance for the disposition of a tension spring as shown in dotted lines 29 extending transversely across an inner portion of the shoe from the pin 30. The structure permits the application of the spring to the pin upon a point nearest to the adjacent surface of the shoe.

The mechanism for actuating the shoe S is well known in the art. In the drawings I have shown a brake shoe operating rod 31 connected at 32 to the outer end of the shoe. This rod is actuated by a hydraulic mechanism including a piston in a cylinder 33 substantially of such structure as is illustrated in my prior Patent No. 1,507,389 issued September 2, 1924. In this patent the mechanism for controlling the fluid pressure to the cylinder is also set forth.

What I claim and desire to secure by Letters Patent of the United States is:

1. A stamped brake shoe having a brake lining supporting surface, one end of said shoe being formed to receive a pin for pivotally mounting the shoe, and a reenforcing member lying in a surface perpendicular to the plane of the body of the shoe and gradually increasing in area from the free end to the pivotal end of the shoe.

2. A stamped brake shoe comprising a pair of pressed metal plates secured to one another and fashioned to provide a contiguous brake lining supporting surface, one end of said shoe being formed to receive a pin for pivotally mounting the shoe, said plates being bent laterally in opposite directions to form reenforcing means lying in a surface perpendicular to the plane of the body of the shoe and gradually increasing in area from the free end to the pivotal end of the shoe.

3. A brake shoe having a brake lining supporting surface, one end of the shoe being formed for the pivotal mounting thereof, and a reinforcing member lying in a surface perpendicular to the plane of the body of the shoe and being greater in area at the pivotal end of the shoe than at the free end.

In witness whereof, I hereunto subscribe my name this 12 day of March, 1927.

MALCOLM LOUGHEAD.